April 5, 1927.  
A. LAUB  
1,623,418  
CHANGE SPEED GEARING  
Filed Sept. 8, 1925
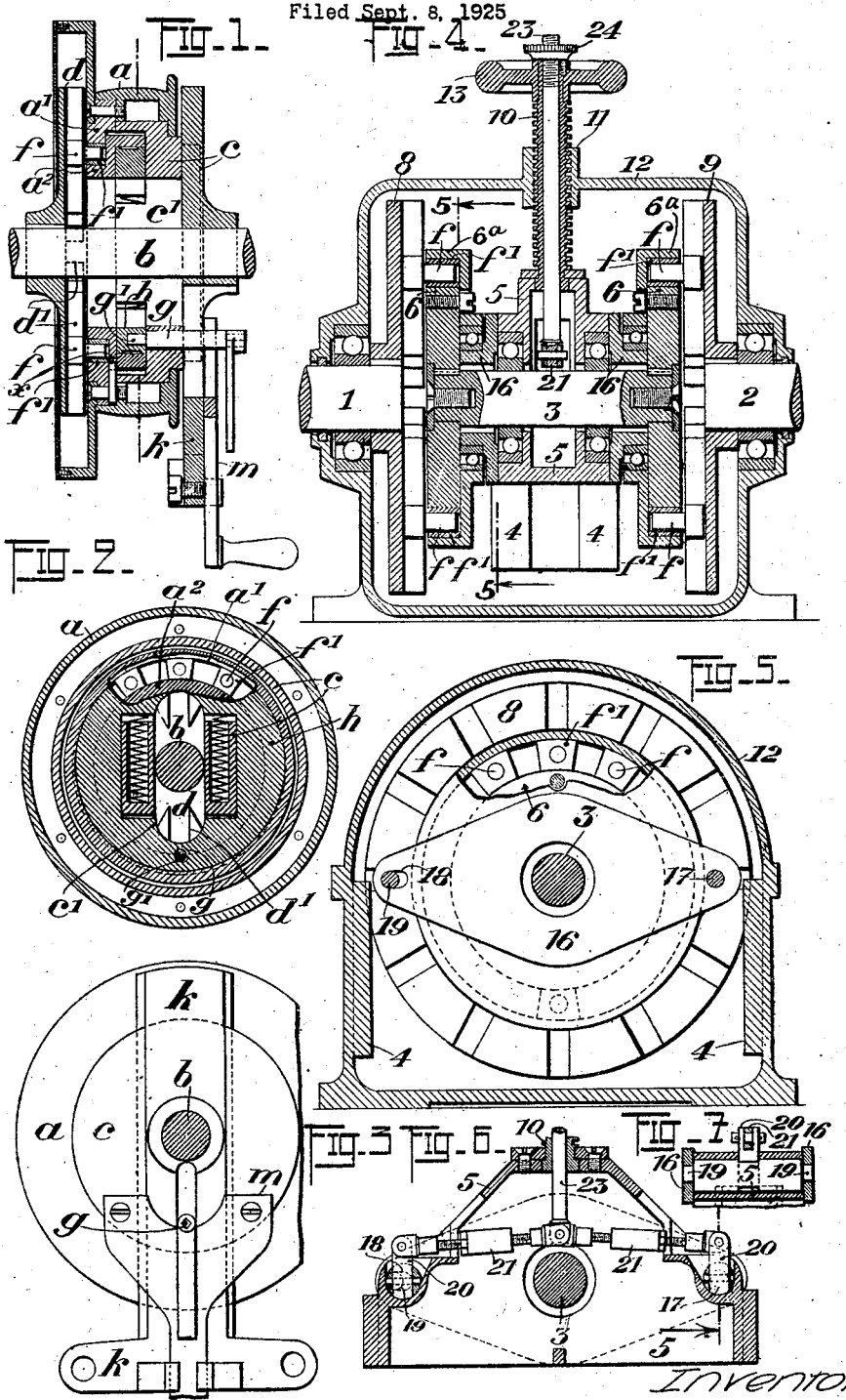
Inventor  
A. Laub  
by Langner, Parry, Card & Langner,  
Attys.

Patented Apr. 5, 1927.

1,623,418

UNITED STATES PATENT OFFICE.

ADOLF LAUB, OF BASEL, SWITZERLAND, ASSIGNOR TO THE FIRM PROGRESSION S. A., OF LA CHAUX-DE-FONDS, SWITZERLAND.

CHANGE-SPEED GEARING.

Application filed September 8, 1925, Serial No. 55,131, and in Switzerland September 22, 1924.

This invention relates to change speed gearing of the kind in which the motion of the rotary driving element is communicated to the rotary driven element by means of driving members eccentrically adjustable relative to the axis of rotation in radial guides provided in one of these elements.

In prior constructions these driving elements usually consist of spring controlled pawls, but as the latter may cause trouble when rapidly rotated they are replaced, according to the present invention, by members inserted between two rings which are slightly adjustable eccentrically relative to one another, so that during rotation these members become wedged one after another at the narrowest part of the space between the rings so that in this position the members hold the rotating elements coupled to one another and subsequently run freely again.

The drawing illustrates two constructional forms of the invention:

Figure 1 is an axial section and Figure 2 a cross section of a driving belt pulley provided with one constructional form of the invention;

Figure 3 is a partial front view of Figure 1;

Figure 4 is an axial section through a compound gear composed of two separate gears constructed according to the invention, and arranged to effect higher gear ratios of transmission;

Figure 5 is a cross-section on the line 5—5 of Figure 4;

Figures 6 and 7 illustrate details of an adjusting device for this compound gearing.

In the construction according to Figures 1, 2 and 3, the belt pulley $a$ is the driving element and the shaft $b$ the rotary driven element. The belt pulley $a$ is mounted so as to rotate freely on a central body $c$. The disc $d$ is secured to the shaft $b$ and is provided with radial guide slots $d^1$ for the carriers $f$ arranged in the form of a ring. By means of these slots the carrier ring can be adjusted concentrically or eccentrically to the axis of the shaft. The carriers $f$ are shown at $f^1$ as sliding blocks, which are located between two rings $a^1$ and $a^2$ firmly connected to the belt pulley $a$ as regards rotation, one of said rings, $a^1$, being rigidly connected to the pulley $a$, whilst the other $a^2$ is freely rotatable on a ring plate $h$ displaceably arranged within the central body $c$, being however connected to the pulley $a$ so as to partake of its rotary movement, by means of a radially directed key $x$ fixed on the pulley $a$. These rings $a^1$, $a^2$ are adjusted slightly eccentrically to one another, so that they form a restricted passage for the sliding blocks $f^1$ at one point, and at the diametrically opposite point an enlarged passage for these blocks. When the sliding blocks $f^1$ arrive at this restricted part they become wedged between the rings $a^1$, $a^2$ thus rigidly coupling the latter together, and the rotary movement of the belt pulley is thereby transmitted to the disc $d$ and thus to the shaft $b$. The relative eccentric adjustment of the rings $a^1$, $a^2$ is effected by means of an eccentric pin $g^1$ engaging with the radially displaceable spring controlled ring plate $h$, which supports the ring $a^2$.

In order to alter the gear ratio of transmission the central body $c$, together with the rotatable belt pulley $a$ and the rings $a^1$, $a^2$, is displaced by means of a slider mounted on a rigid guide plate $k$, so that the ring supporting the carriers $f$ is adjusted concentrically or eccentrically to the shaft axis. With a concentric adjustment of the carrier ring the transmission of motion is effected without change of speed, whereas, with eccentric adjustment the transmission of motion is more highly geared up the greater the eccentricity of the carrier ring. The central body $c$ which is provided with a longitudinal slit $c^1$ (Figure 2) can be displaced by means of a hand operated plate $m$ secured thereto, and preferably adapted to be secured in position after adjustment. The belt is applied to the belt pulley $a$ in such a manner that the motion of the former is in a direction perpendicular to the direction of movement of the central body $c$, so that the former motion offers no hindrance to the latter movement.

If the carrier ring is adjusted eccentrically for the desired gear ratio, the carrier sliding blocks $f^1$ upon rotation of the belt pulley $a$ are rigidly wedged one after another at the restricted part of the passage between the rotating rings $a^1$, $a^2$, so as to transmit the movement of the belt pulley $a$ to the disc $d$, and after passing the restricted part these blocks run freely again one after another, the distribution of the carriers over the circumference of the gear being such that at any time one at least of the carriers is wedged, so that no interruption can take place in the transmission of the motion. In this manner the motion of the belt pulley $a$ is transmitted to the shaft $b$ in the adjusted speed ratio. For free running the ring $a^2$ is adjusted so as to be exactly concentric to the ring $a^1$ by means of the eccentric pin $g$, so that the carrier sliding blocks $f^1$ can pass through the space between the rings freely with slight play.

With double gearing according to Figures 4–7, 1 is a driving and 2 a driven shaft between which is inserted a shaft section 3, which may be regarded relative to the shaft 1 as a driven shaft, and relative to the shaft 2 as a driving shaft. The shaft section 3 forms part of a central body 5 movable to-and-fro in a guide 4; it is pivotally supported in this guide on ball bearings and carries at each individual gearing the rings 6 and $6^a$ for wedging the sliding blocks $f^1$ of the carriers $f$, which are adjustable in the radial guide slots of the discs 8 or 9 secured to the shafts 1 or 2. The operation of the carrier in transmitting the movement from one element to the corresponding other element is in this case the same as before for each individual gearing. The adjustment of the carrier $f$ is effected for each of the gears at the same time and in the same direction by means of the central body 5, which for this purpose is pivotally connected with a screw-threaded spindle 10 passing through a screw-threaded boss 11 on the gear box, and its movement can be effected by means of a hand wheel 13. On the other hand the reciprocal eccentric adjustment of the rings 6, $6^a$ in the two individual gears is such that while in one of these gears the restricted part between the rings is located in a certain position, in the other the restricted part is in a diametrically opposite position, so that a double gearing up of the motion can take place. The latter object is attained by the adjusting device shown in Figures 6 and 7. The outer rings $6^a$ of the two individual gears are pivotally mounted on cylindrical bosses formed on cross plates 16, which are each mounted on a fixed pivot 17 (Figure 5) at one end, and are each provided at the other end with a slot 18 in which projects a rotatable eccentric pivot 19, the fixed pivots 17 being at opposite ends of the two cross plates. The eccentric pivots 19 are so connected with a common rod 21 by means of the arms 20 that by moving the former the one eccentric pivot 19 is rotated downwards and the other upwards and thereby the cross plates 16 are rotated in opposite directions to one another, so that in one gearing the restricted part of the rings 6, $6^a$ for wedging the carrier is formed below, and in the other gearing above. The rod 21 can be adjusted by means of a screw-threaded spindle 23 which traverses the screw-threaded spindle 10 the latter in this case being made hollow throughout its whole length for this purpose, the spindle 23 being provided with an adjusting nut 24 at its upper end. Obviously in this case the rings 6, $6^a$ in the two gearings can be adjusted concentrically to one another by means of a suitable adjustment of the rod 21 thus permitting free running.

What I claim is:—

1. A change speed gearing comprising a rotary driving element, a rotary driven element, a series of coupling members eccentrically adjustable relative to the axis of rotation of the gear on one of said rotary elements, two rings on the other rotary element to receive said coupling members between them and positioning means to so position said rings as to be slightly eccentric to one another, for the purpose specified.

2. A change speed gearing comprising a rotary driving element, a rotary driven element, a series of coupling members eccentrically adjustable relative to the axis of rotation of the gear on one of said rotary elements, two rings on the other rotary element to receive said coupling members between them, means to connect said rings with said rotary element in the direction of rotation whilst allowing a relative radial displacement thereof, and adjusting means to so position said rings as to be slightly eccentric to one another, for the purpose specified.

3. A change speed gearing comprising a rotary driving element, a rotary driven element, a series of coupling members eccentrically adjustable relative to the axis of rotation of the gear on one of said rotary elements, two rings on the other rotary element to receive said coupling members between them, and a displaceable central body for rotatably supporting said rings, arranged to cause by its displacement the eccentric adjustment of the coupling members.

4. A change speed gearing comprising a rotary driving element, a rotary driven element, a series of coupling members eccentrically adjustable relative to the axis of rotation of the gear on one of said rotary elements, two rings on the other rotary element to receive said coupling members between them, and positioning means to so position said rings as to be slightly eccentric to one another, said positioning means being arranged to allow of a concentric adjustment of said rings to one another for a free running of the coupling members in the space between the rings.

In witness whereof I have hereunto signed my name this 26th day of August, 1925.

ADOLF LAUB.